US007264112B2

(12) United States Patent
Werner

(10) Patent No.: US 7,264,112 B2
(45) Date of Patent: Sep. 4, 2007

(54) METHOD FOR COOLING COMPONENTS SUBJECTED TO HIGH TEMPERATURES

(75) Inventor: Todd C. Werner, St. Petersburg, FL (US)

(73) Assignee: Pitney Bowes Inc., Stamford, CT (US)

( * ) Notice: Subject to any disclaimer, the term of this patent is extended or adjusted under 35 U.S.C. 154(b) by 64 days.

(21) Appl. No.: 11/162,751

(22) Filed: Sep. 21, 2005

(65) Prior Publication Data

US 2007/0062785 A1 Mar. 22, 2007

(51) Int. Cl.
*B65G 13/02* (2006.01)

(52) U.S. Cl. ......................... 198/780; 198/952; 193/37

(58) Field of Classification Search ................ 198/780, 198/781.03, 781.04, 781.05, 781.06, 781.07, 198/781.08, 781.09, 860.1, 861.1, 952, 788, 198/789, 790; 193/37
See application file for complete search history.

(56) References Cited

U.S. PATENT DOCUMENTS 1,392,626 A * 10/1921 Cox ............................ 193/37
4,049,372 A * 9/1977 Bloom ........................ 198/782
5,918,719 A * 7/1999 Hino et al. .................... 193/37
6,523,775 B2 * 2/2003 Fan ............................ 198/952
6,619,471 B1 * 9/2003 Downie et al. ............. 198/780
6,672,098 B2 * 1/2004 Norris ........................ 198/952
6,918,708 B2 * 7/2005 Noda et al. ................. 198/780

* cited by examiner

*Primary Examiner*—James R. Bidwell
(74) *Attorney, Agent, or Firm*—Christopher H. Kirkman; Steven J. Shapiro; Angelo N. Chaclus

(57) ABSTRACT

Heat is transferred away from the rollers and base of a printer heater by introducing chilled water into the rollers and the base. The paper upon which print has been applied remains at an elevated temperature so that the drying of the print is not delayed. A conventional roller is modified by having an annular cavity formed in its interior and providing fluid communication between the cavity and a chiller. A conventional base is modified by the addition of a serpentine passageway formed in its interior and providing fluid communication between the passageway and the chiller. Cold water provided by the chiller to the roller prevents breaking down of oil in the bearings of the roller. Cold water provided by the chiller to the base carries the heat from the base, increasing the safety of the workplace and extending the working lifetime of the base and its related parts.

2 Claims, 3 Drawing Sheets

METHOD FOR COOLING COMPONENTS SUBJECTED TO HIGH TEMPERATURES

1. Field of the Invention

This invention relates, generally, to high-speed printers. More particularly, it relates to a high-temperature heater that rapidly dries a solvent-based ink or a water-based dye that is applied to paper by the printer.

2. Description of the Prior Art

In both solvent-based inks and water-based dyes, a heater is positioned downstream of the printer to quickly evaporate the solvent and the water, respectively.

However, water does not evaporate as quickly as alcohol or other solvent. To enable very high speed printing where a water-based dye is used, a heater used to evaporate the water must operate at a higher temperature than a heater used to evaporate a solvent, or the dwell time of the paper in relation to the heater must be increased, thereby slowing down the printing process.

The paper having printing thereon typically passes beneath the heater at a spacing of less than an inch. If the means for transporting the paper past the heater breaks down, the paper is quickly ignited.

However, the envelopes or other items of paper having printing thereon must be spaced apart from one another by an inch or two as they pass beneath the heater to be dried. Consequently, the gaps between the paper items expose one or two inch sections of the conveyor means to the heat. The base or deck below the conveyor means also becomes heated for the same reason. Moreover, the rollers about which the conveyor means is wrapped are also heated. The oil in the roller bearings breaks down due to the heat and the lubrication fails, causing the entire apparatus to fail.

What is needed, then, is an improvement that protects the conveyor means, the base, and the rollers from the debilitating heat of the heater for both solvent-based inks and water-based dyes.

However, in view of the prior art taken as a whole at the time the present invention was made, it was not obvious to those of ordinary skill how the identified need could be fulfilled.

SUMMARY OF THE INVENTION

The long-standing but heretofore unfulfilled need for a means for cooling components associated with a heater for a high-speed printer is now met by a new, useful, and non-obvious invention.

The novel method includes the steps of providing a flat base having a top surface, a bottom surface, and a straight configuration. A first roller is rotatably mounted to the base at a first end and a second roller is mounted to the base at a second end thereof. A conveyer means is wrapped around the base so that the first and second rollers define a path of travel for the conveyor means. A heater is positioned in closely spaced relation to the top surface of the base, in heat-transferring relation to the conveyor means and to the base that supports the conveyor means.

At least one internal passageway having an inlet and an outlet is formed in the base. Fluid communication is established between a remote source of chilled water and the at least one internal passageway. More particularly, an outlet of the remote source of chilled water is connected to the inlet of the at least one internal passageway, and the outlet of the at least one internal passageway is connected to an inlet of the remote source of chilled water. Chilled water is circulated through the at least one internal passageway when the heater is operating so that the base is cooled.

In a second embodiment, at least one internal passageway having an inlet and an outlet is formed in the base on a first side of the conveyor means and at least one internal passageway having an inlet and an outlet is formed in the base on a second side of the conveyor means. Fluid communication is established between a remote source of chilled water and said at least one internal passageway on the first side of said conveyor means and said at least one internal passageway on the second side of the conveyor means. More particularly, an outlet of the remote source of chilled water is connected to the inlet of the at least one internal passageway on the first side of the conveyor means and to the inlet of the at least one internal passageway on the second side of the conveyor means. An inlet of the remote source of chilled water is connected to the outlet of the at least one internal passageway on the second side of the conveyor means and to the outlet of the at least one internal passageway on the second side of the conveyor means. The chilled water is circulated through the at least one internal passageway on the first side of the conveyor means and through the at least one internal passageway on the second side of the conveyor means when the heater is operating so that the base is cooled.

This invention also includes a method for cooling an external surface of a cylindrical, axle-mounted roller. The steps of the novel method include providing a chiller for cooling water and forming an annular cavity in the roller that encircles the axle of the roller. A first passageway is formed in a first end of the roller axle. The first passageway provides fluid communication with an outlet of the chiller and a first end of the annular cavity formed in the roller. A second passageway is formed in a second end of the roller axle. The second passageway provides fluid communication with an inlet of the chiller and a second end of the annular cavity formed in the roller. Chilled water flows continuously through the annular cavity, thereby cooling the external surface of the roller.

An important advantage of the novel method is that it cools the conveyor means and the base of the dryer apparatus, thereby extending the lifetime of such parts.

A closely related advantage is that the cooling does not affect the drying rate of the ink or dye applied to the paper because the paper is not cooled.

The cooling of the base also has the advantage of eliminating a hazard in the workplace.

Yet another advantage is that the cooling of the rollers prevents the breakdown of the lubrication for the roller bearings, thereby substantially extending the working lifetime of the rollers.

These and other advantages will become apparent as this disclosure proceeds. The invention includes the features of construction, arrangement of parts, and combination of elements set forth herein, and the scope of the invention is set forth in the claims appended hereto.

BRIEF DESCRIPTION OF THE DRAWINGS

For a fuller understanding of the nature and objects of the invention, reference should be made to the following detailed description, taken in connection with the accompanying drawings, in which.

DETAILED DESCRIPTION OF THE PREFERRED EMBODIMENT

Figure 1:
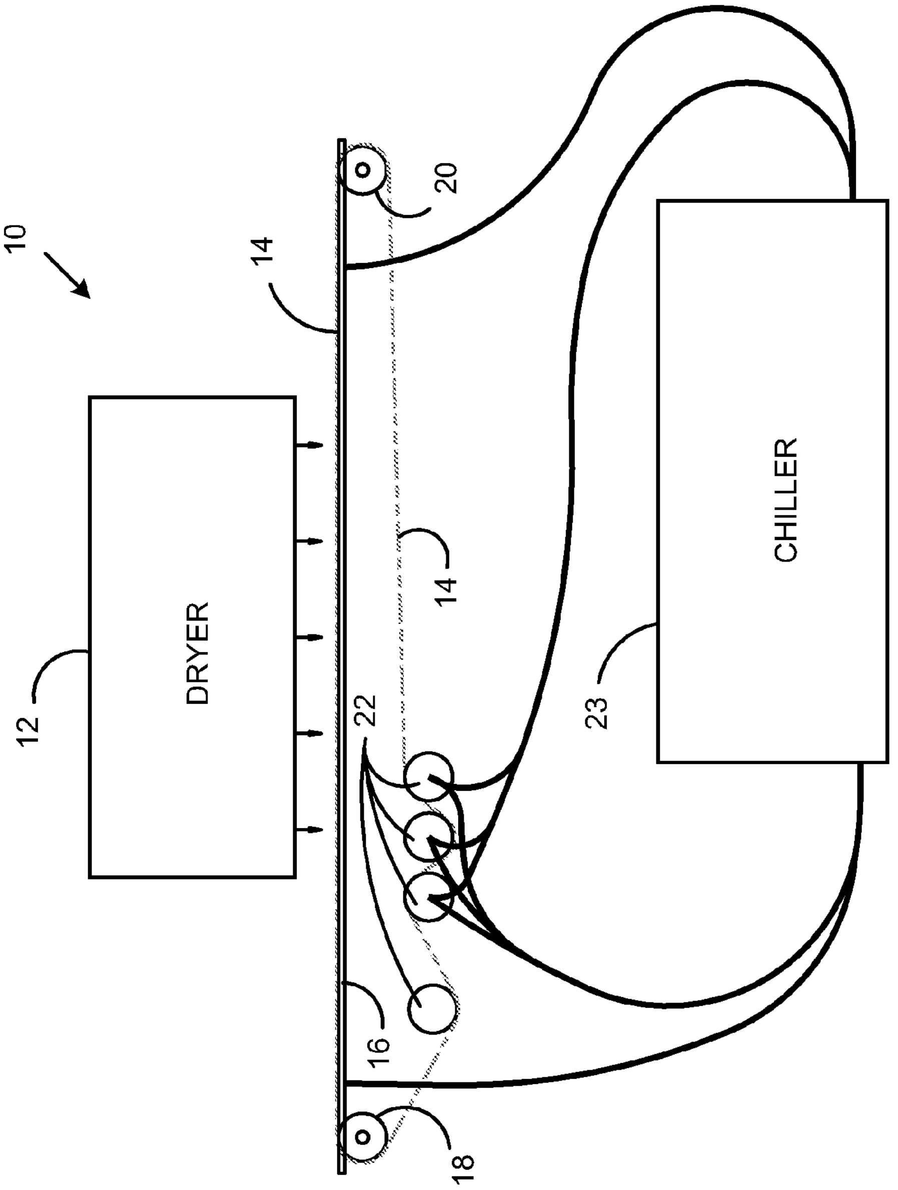
FIG. 1 is a side elevational view of the dryer, the base, the conveyor means and the water chiller.

Referring now to FIG. 1, it will there be seen that an illustrative embodiment of the invention is denoted as a whole by the reference numeral 10.

The apparatus denoted as a whole by the reference numeral 10 is downstream from a high-speed printer, not shown. Apparatus 10 includes a heater 12, also known as a dryer, that generates infrared radiation to cause rapid evaporation of water so that the printer may be operated at very high speeds. Heaters of this type typically consume about nine thousand (9000) watts. However, as printer speeds increase, heaters that consume eighteen thousand (18,000) watts are being developed.

Vacuum belt 14 follows a path of travel as depicted in FIG. 1 that carries it under dryer 12. When vacuum belt 14 is traveling under dryer 12, said vacuum belt is supported by flat tabletop or base 16.

A first drive roller 18 is mounted at a first end of base 16, upstream of dryer 12, and a second drive roller 20 is mounted at a second end of base 16, downstream of dryer 12. The rollers collectively denoted 22 are idler rollers that cooperate with the drive rollers to define the path of travel of vacuum belt 14. Vacuum belt 14 has a one hundred eighty degree (180°) contact with second drive roller 20 and almost the same amount of contact with first drive roller 18. In this particular configuration, said vacuum belt 14 has less contact with each individual idler roller.

Chiller 23 which is commercially available, circulates cold water and may be positioned at any convenient remote location.

Figure 2:
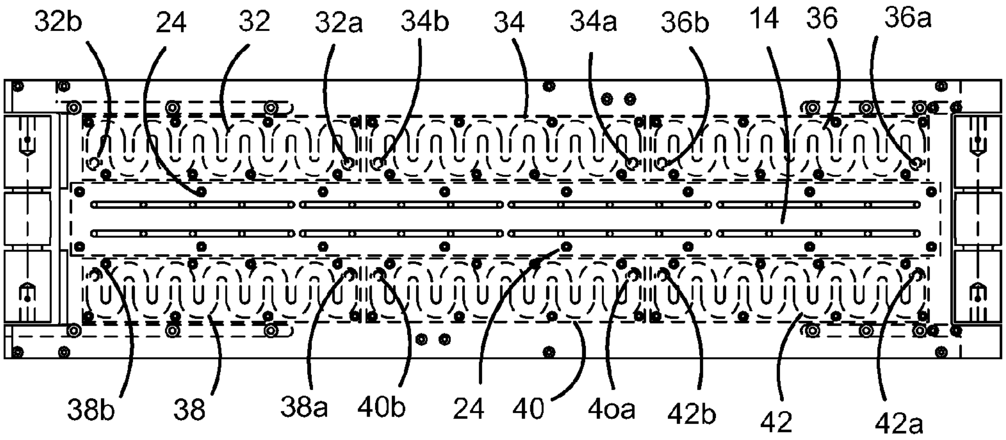
FIG. 2 is a top plan view of an embodiment where a plurality of internal passageways are formed in the base on opposite sides of the conveyor means.
Figure 3:
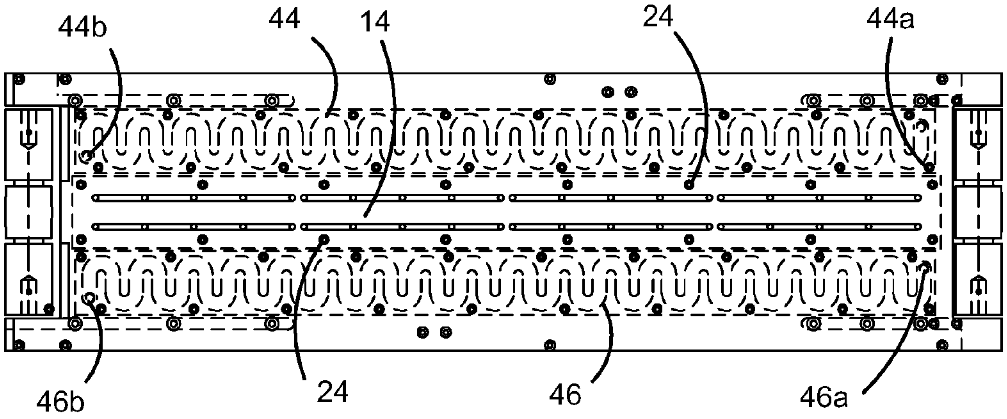
FIG. 3 is a top plan view of an embodiment where one internal passageway is formed in the base on opposite sides of the conveyor means.

As best understood in connection with FIGS. 2 and 3, vacuum belt 14 extends along the longitudinal axis of symmetry of base 16, i.e., it is positioned in the middle of the base in equidistantly spaced apart relation from the opposite sides thereof.

Openings 24 formed in vacuum belt 14 are in fluid communication with a remote source of air under negative pressure, not shown. Accordingly, an envelope or other item having an address applied thereto by a high-speed printer is held to vacuum belt 14 by said vacuum so that the envelope travels at the same speed as the vacuum belt.

In a preferred embodiment, depicted in FIG. 2, serpentine internal passages 32, 34, and 36, are formed in base 16 on a first side of vacuum belt 14 and internal passages 38, 40, and 42, are formed in base 16 on a second side of said vacuum belt.

Internal passage 32 has inlet **32*a* and outlet 32*b*. Internal passage 34 has inlet 34*a* and outlet 34*b*. Internal passage 36 has inlet 36*a* and outlet 36*b*. Internal passage 38 has inlet 38*a* and outlet 38*b*. Internal passage 40 has inlet 40*a* and outlet 40*b*. Internal passage 42 has inlet 42*a* and outlet 42*b***.

However, some of the internal passages could be combined with one another to decrease the number of inlets and outlets. For example, in the embodiment of FIG. 3, internal passages 32, 34, and 36 are combined into a single internal passageway 44 having inlet **44*a* and outlet 44*b*. Similarly, in said FIG. 3 embodiment, internal passageways 38, 40, and 42 are combined into single internal passageway 46 having inlet 46*a* and outlet 46*b***.

Cold water is circulated through each internal passage by chiller 23 so that base 16 does not become overheated.

The embodiment of FIG. 2 cools base 16 to a greater extent than the embodiment of FIG. 3. These two examples are disclosed to illustrate the invention, but those of ordinary skill in the art will now appreciate that the number of distinct internal passageways may be increased as dryers having increased heating capacity are used and the number of distinct internal passageways may be decreased where dryers that produce lower temperatures are used.

It should also be understood that the internal passageways depicted in FIGS. 2 and 3 need not be serpentine in configuration. They could be straight, saw-toothed, and so on. Moreover, FIGS. 2 and 3 may also be interpreted as depicting a single internal passageway formed in base 16, i.e., a single internal passageway may be formed in base 16 on only one side of conveyor means 14, and such structure is within the scope of this invention and is included in the drawings as a subset of the depicted internal passageways.

Figure 4:
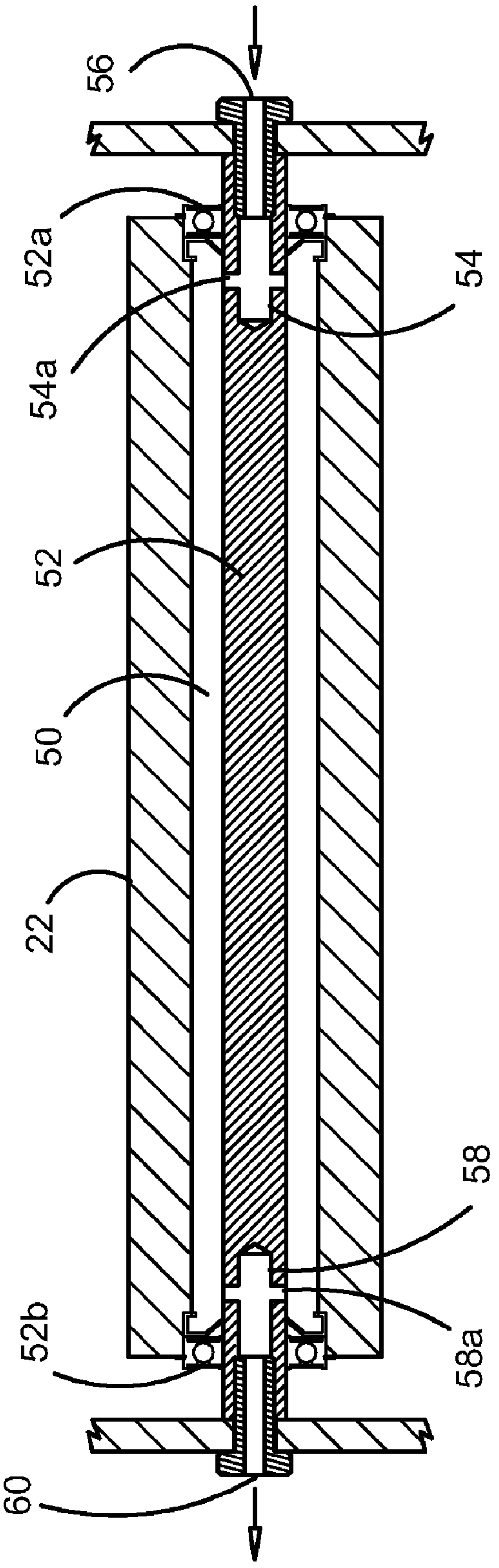
FIG. 4 is a longitudinal sectional view of a roller having an annular passageway formed therein so that chilled water may flow therethrough.

Turning now to FIG. 4, it will there be seen that an idler roller 22 is modified so that cold circulating water is delivered to the interior of said roller. Specifically, the roller is hollow so that annular chamber 50 surrounds axle 52 of said roller. The bearings of axle 52 are denoted **52*a* and 52*b***, said bearings including ball races as depicted.

A first passageway 54 is formed in a first end of roller axle 52, in coincidence with the axis of rotation of said roller. A radially extending branch **54*a* of said passageway provides fluid communication between passageway 54 and annular chamber 50. Port 56 is in fluid communication with an outlet of chiller 23**.

A second passageway 58 is formed in a second end of roller axle 52, in coincidence with the axis of rotation of said roller. A radially extending branch **58*a* of said passageway provides fluid communication between second passageway 58 and annular chamber 50. Port 60 is in fluid communication with an inlet of chiller 23**.

Chilled water flows continuously through annular cavity 50, thereby cooling the external surface and the bearings of roller 22. Such cooling extends the lifetime of the roller and said bearings. Any number of idler rollers, drive rollers, or combinations thereof may be cooled in this or similar ways.

Advantageously, the above-disclosed cooling of the base and the idler roller serve to also cool the vacuum belt, but does not cool the paper. The novel cooling methods therefore do not inhibit the water-evaporation process. Base 16 is cooled so that it is safe to touch, and the working lifetime of the vacuum belt and the idler roller is considerably lengthened.

It will thus be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A method for cooling components associated with a heater for a high-speed printer, comprising the steps of:

providing a flat base having a top surface, a bottom surface, and a straight configuration;

rotatably mounting a first roller to said base at a first end thereof and a second roller to said base at a second end thereof;

wrapping a conveyer means around said base so that said first and second rollers define a path of travel for said conveyor means;

positioning a heater in closely spaced relation to said top surface of said base;

positioning said heater so that said heater is in heat-transferring relation to said conveyor means;

forming at least one internal passageway in said base, said at least one internal passageway having an inlet and an outlet;

providing fluid communication between a source of chilled water and said at least one internal passageway;

connecting an outlet of said source of chilled water to said inlet of said at least one internal passageway;

connecting said outlet of said at least one internal passageway to an inlet of said source of chilled water; and circulating said chilled water through said at least one internal passageway when said heater is operating so that said base is cooled.

2. A method for cooling components associated with a heater for a high-speed printer, comprising the steps of:

providing a flat base having a top surface, a bottom surface, and a straight configuration;

rotatably mounting a first roller to said base at a first end thereof and a second roller to said base at a second end thereof;

wrapping a conveyer means around said base so that said first and second rollers define a path of travel for said conveyor means;

positioning a heater in closely spaced relation to said top surface of said base;

positioning said heater so that said heater is in heat-transferring relation to said conveyor means;

forming at least one internal passageway in said base on a first side of said conveyor means, said at least one internal passageway having an inlet and an outlet;

forming at least one internal passageway in said base on a second side of said conveyor means, said at least one internal passageway having an inlet and an outlet;

providing fluid communication between a source of chilled water and said at least one internal passageway on said first side of said conveyor means;

providing fluid communication between a source of chilled water and said at least one internal passageway on said second side of said conveyor means;

connecting an outlet of said source of chilled water to said inlet of said at least one internal passageway on said first side of said conveyor means;

connecting an outlet of said source of chilled water to said inlet of said at least one internal passageway on said second side of said conveyor means;

connecting said outlet of said at least one internal passageway on said first side of said conveyor means to an inlet of said source of chilled water;

connecting said outlet of said at least one internal passageway on said second side of said conveyor means to an inlet of said source of chilled water; and circulating said chilled water through said at least one internal passageway on said first side of said conveyor means and through said at least one internal passageway on said second side of said conveyor means when said heater is operating so that said base is cooled.

* * * * *